(12) United States Patent
Suh

(10) Patent No.: US 10,558,825 B1
(45) Date of Patent: Feb. 11, 2020

(54) METHOD FOR SHARING BUSINESS INFORMATION BASED ON MUTUAL CONFIRMATION BLOCKCHAIN

(71) Applicant: ASADAL, Inc., Seoul (KR)

(72) Inventor: Chang Nyoung Suh, Gwangmyeong-si (KR)

(73) Assignee: ASADAL, INC., Seoul (KR)

( * ) Notice: Subject to any disclaimer, the term of this patent is extended or adjusted under 35 U.S.C. 154(b) by 0 days.

(21) Appl. No.: 16/275,121

(22) Filed: Feb. 13, 2019

(30) Foreign Application Priority Data

Aug. 13, 2018 (KR) .......................... 10-2018-0094551

(51) Int. Cl.
*G06F 21/64* (2013.01)
*G06Q 20/38* (2012.01)
*G06F 16/23* (2019.01)

(52) U.S. Cl.
CPC .......... *G06F 21/64* (2013.01); *G06F 16/2365* (2019.01); *G06Q 20/389* (2013.01)

(58) Field of Classification Search
None
See application file for complete search history.

(56) References Cited

U.S. PATENT DOCUMENTS

| 10,102,526 B1 * | 10/2018 | Madisetti | H04L 9/3239 |
| 2002/0007302 A1 * | 1/2002 | Work | G06Q 10/06 |
| | | | 705/7.29 |
| 2015/0206106 A1 * | 7/2015 | Yago | G06Q 20/0658 |
| | | | 705/68 |
| 2016/0217532 A1 * | 7/2016 | Slavin | G06Q 40/08 |
| 2016/0350728 A1 * | 12/2016 | Melika | G06Q 20/0655 |
| 2017/0132625 A1 * | 5/2017 | Kennedy | G06Q 20/065 |
| 2017/0134280 A1 * | 5/2017 | Davis | G06Q 20/10 |
| 2017/0330250 A1 * | 11/2017 | Arjomand | G06Q 30/0279 |
| 2017/0344988 A1 * | 11/2017 | Cusden | H04L 9/3247 |
| 2017/0364700 A1 * | 12/2017 | Goldfarb | G06F 21/64 |
| 2018/0025435 A1 * | 1/2018 | Karame | G06Q 40/12 |
| | | | 705/30 |
| 2018/0032383 A1 * | 2/2018 | Surcouf | G06F 9/546 |
| 2018/0109516 A1 * | 4/2018 | Song | H04L 9/3263 |

(Continued)

FOREIGN PATENT DOCUMENTS

| KR | 10-2004-0102639 A | 12/2004 |
| KR | 10-2017-0078452 A | 7/2017 |
| KR | 10-2017-0123766 A | 11/2017 |

OTHER PUBLICATIONS

Eyal et al., "Majority is not Enough: Bitcoin Mining is Vulnerable", Department of Computer Science, Crnell University, arXiv: 1311.0243v5, Nov. 2013.*

(Continued)

*Primary Examiner* — Piotr Poltorak
(74) *Attorney, Agent, or Firm* — Heedong Chae; Lucem, PC

(57) ABSTRACT

Provided is a method for sharing business information based on a mutual confirmation blockchain and more particularly, a method for sharing business information based on a mutual confirmation blockchain which secures reliability and integrity of the business information registered in each of a plurality of different nodes constituting the blockchain on the basis of the blockchain and supports rapid sharing of the business information.

8 Claims, 6 Drawing Sheets

(56) References Cited

U.S. PATENT DOCUMENTS

| | | | | |
|---|---|---|---|---|
| 2018/0121918 A1* | 5/2018 | Higgins | ............... | G06Q 20/065 |
| 2018/0121923 A1* | 5/2018 | Uhr | ..................... | G06Q 20/223 |
| 2018/0218176 A1* | 8/2018 | Voorhees | ............. | H04L 9/3239 |
| 2018/0268418 A1* | 9/2018 | Tanksali | ............... | G06Q 30/012 |
| 2019/0034917 A1* | 1/2019 | Nolan | .................. | G06Q 20/367 |
| 2019/0036887 A1* | 1/2019 | Miller | .................... | G06F 21/60 |
| 2019/0050854 A1* | 2/2019 | Yang | ................... | G06Q 20/382 |
| 2019/0080406 A1* | 3/2019 | Molinari | ................ | G06Q 20/06 |
| 2019/0081789 A1* | 3/2019 | Madisetti | .............. | H04L 9/3213 |
| 2019/0089716 A1* | 3/2019 | Stocker | ................ | H04L 67/104 |
| 2019/0158594 A1* | 5/2019 | Shadmon | .............. | H04L 9/0819 |
| 2019/0228133 A1* | 7/2019 | Ansari | ................. | H04L 9/3263 |
| 2019/0354723 A1* | 11/2019 | Dassenno | ............ | H04L 9/3242 |

OTHER PUBLICATIONS

Wikipedia, "Mining pool", author unknown, found at en.wikipedia.org/wiki/Mining_pool, Dec. 2017.*

Larissa Lee, "New Kids on the Blockchain: How Bitcoin's Technology Could Reinvent the Stock Market", Hasting Business Law Journal, vol. 12 Nr. 2, Winter 2016.*

Ritesh Modi, "Introduction to Blockchain, Ethereum and Smart Contracts—Chapter 1" found at https://medium.com/coinmonks/https-medium-com-ritesh-modi-solidity-chapter1-63dfaff08a11,May 2018.*

Mukesh Thakur, "Authentication, Authorization and Accounting with Ethereum Blockchain", Master's Thesis University of Helsinki, Department of Computer Science, Sep. 2017.*

* cited by examiner

METHOD FOR SHARING BUSINESS INFORMATION BASED ON MUTUAL CONFIRMATION BLOCKCHAIN

CROSS-REFERENCE TO RELATED APPLICATIONS

This application claims the priority of Korean Patent Application No. 10-2018-0094551 filed on Aug. 13, 2018, in the Korean Intellectual Property Office, the disclosure of which is incorporated herein by reference.

BACKGROUND OF THE INVENTION

Field of the Invention

The present invention relates to a method for sharing business information based on a mutual confirmation blockchain and more particularly, to a method for sharing business information based on a mutual confirmation blockchain which secures reliability and integrity of the business information registered in each of a plurality of different nodes constituting the blockchain based on the blockchain and supports fast sharing of the business information.

Description of the Related Art

With the development of the Internet, business information of various companies has been currently provided online, and a user may easily obtain the business information of a desired business by accessing the Internet.

Such business information may be used for a variety of purposes such as selecting a contract target among companies, applying for employment or investing in a user, and thus, reliability and security for business information registered by a business are necessarily required.

Currently, the system of providing sharing of the business information performs certification for the business information registered by the business through collaboration with a separate certification authority to secure reliability of the business information, but there is still a possibility that a self-error of the system in which the business information is registered, or a hacking for the system from the outside or an unauthorized change of the business information by a malicious business may occur, and as a result, there is a problem that it is difficult to secure the integrity of data related to the system and the business information.

Further, even when the certification period of the certification authority expires, the business may intentionally include certification documents of its certification authority in the business information and distribute the certification documents to users, and there is no preventive measure against this, and there is an inconvenience that the user needs to directly confirm the certification period individually.

Therefore, existing certification and sharing methods for the business information are not perfect solutions to the integrity and reliability of the business information, and alternatives for securing the integrity and reliability of the business information shared among users have been required.

SUMMARY OF THE INVENTION

An object of the present invention is to secure reliability and integrity for business information by sharing business information related with a business between a plurality of different terminals based on a blockchain and supporting mutual confirmation to be performed between a business registering the business information and an authority confirming business information to secure reliability of the business information and distributing and storing a transaction occurring in the mutual confirmation process in a plurality of different nodes through the blockchain to prevent forgery and falsification of the certificated business information.

According to an embodiment of the present invention, there is provided a method for sharing business information based on a mutual confirmation blockchain in which a plurality of certified terminals are connected to each other through a network, an application unit for operating each of the plurality of certified terminals as a node of the blockchain is constituted in each of the plurality of different terminals, and business information registered in the blockchain is shared among the plurality of the certified terminals, the method including: registering, by the application unit of a specific node, approver information corresponding to an approver of the business information to be shared which is included in the business information; transmitting, by the application unit of the specific node, request information for requesting certification of the business information registered in the blockchain to the approver node corresponding to the approver; confirming, by the application unit of the specific node, validity by confirming the business information corresponding to the request information and registering certification information including the business information in the blockchain when the validity is confirmed; confirming, by the application unit of each of all the nodes constituting the blockchain, the validity of the certification information to register the validity in a preset shared ledger when the confirmation is successful; and generating and storing, by the application units of the specific node and the approver node, compensation information according to the registration of the certification information.

As an example related with the present invention, the method may further include registering, by the application unit of the specific node, a browsing right of the business information to be included in the business information when registering the business information.

As an example related with the present invention, the method may further include generating a block corresponding to the certification information and then transmitting the generated block to one or more other nodes participating in the blockchain, by the application unit of the node having a generation right of the block corresponding to the business information or the certification information among mode nodes constituting the blockchain; and registering, by the application unit of each of one or more other nodes, the block in the shared ledger by connecting the block to a previous block of the shared ledger.

As an example related with the present invention, the method may further include calculating, by the application unit of each of all the nodes constituting the blockchain, a sharing ratio of the nodes having a predetermined share or more based on the compensation information generated and cumulatively stored through the blockchain and then generating a block corresponding to the business information or certification information, by an application unit of a node randomly selected according to a method of determining a probability to be selected as a block generator in proportional to the sharing ratio held for each node to transmit the generated block to other nodes.

As an example related with the present invention, the method may further include generating a block corresponding to the business information or certification information and then transmitting the generated block to one or more other nodes participating in the blockchain by an application unit of a node having proof of work for the block corresponding to the business information or the certification information among the mode nodes constituting the blockchain.

As an example related with the present invention, the method may further include generating and storing the compensation information by an application unit of a node having the proof of work.

As an example related with the present invention, the method may further include registering, by the application unit of the specific node, business information in which a contract condition exists; generating a transaction according to the execution of the contract condition to register the generated transaction in the blockchain, by an application unit of a node corresponding to a condition execution subject of the contract condition when generating a transaction satisfying the contract condition of the business information in which the validity is confirmed by the approver node; and confirming, by the application unit of each of all nodes constituting the blockchain, the validity of the transaction to register the validity in the predetermined shared ledger when the confirmation is successful.

As an example related with the present invention, the method may further include generating a transaction according to the execution of the contract condition to register the generated transaction in the blockchain, by an application unit of a node corresponding to a condition execution subject of a satisfying condition whenever any one of a plurality of contract conditions is satisfied when the business information has a plurality of contract conditions.

As an example related with the present invention, the method may further include subtracting, by the application unit of the specific node, a predetermined setting amount of a holding amount cumulatively stored according to the compensation information in the electronic wallet of the specific node corresponding to the business information requiring the fast processing and generating the request information including paid information that promises to pay the setting amount to the approver of the approver node upon fast processing of the business information to transmit the generated request information to the approver node; and storing, by the application unit of the specific node, a registration-related transaction of the business information requiring the fast processing in a predetermined temporary storage space and searching business information corresponding to the temporary valid information stored in the temporary storage space when searching the shared ledger.

According to another embodiment of the present invention, there is provided a system for sharing business information based on a blockchain of mutually sharing business-related business information through the blockchain, in which a plurality of different terminals are connected to each other through a network, an application unit for operating the confirmed terminal as a node of the blockchain is constituted in each of the plurality of different terminals, an application unit of a specific node registers approver information corresponding to an approver of the business information to be shared which is included in the business information and transmits request information for requesting confirmation of the business information registered in the blockchain to an approver node corresponding to the approver, an application unit of the approver node confirms validity by confirming the business information corresponding to the request information and registers certification information including the business information in the blockchain when the validity is confirmed, an application unit of each of all the nodes constituting the blockchain confirms the validity of the certification information to register the validity in a preset shared ledger when the confirmation is successful, and the application units of the specific node and the approver node generate and store compensation information according to the registration of the certification information.

As described above, in the present invention, the node corresponding to the business among the plurality of nodes constituting the blockchain confirms that a registration object of the business information is the business associated with the business information through the electronic signature with respect to the business information required for the authority certification, and the authority-related node processing the confirmation on the business information among the plurality of nodes performs the confirmation on the business information to share confirmation result in the blockchain constituted by the plurality of nodes during confirmation. As a result, reliable business information which has been mutually confirmed between the business and the certification authority may be shared so as to be easily confirmed on the blockchain and the confirmed business information may be managed by the blockchain-based block in the plurality of nodes so as not to be forged and falsified, thereby securing the reliability and integrity of the business information.

Further, according to the present invention, in accordance with the smart contract based on the blockchain, the contract information is set in the business information so that the contract contents according to the agreement between the contract parties are automatically executed when the specific condition is satisfied to support the validity of the business information to be automatically lost at the expiration of the validity period set by the authority according to the contract condition or the authority to secure the reliability of the business information whose confirmation is delayed, thereby enhancing the reliability of the sharing of the business information.

Furthermore, the present invention may support the compensation according to the fast confirmation to be paid to the approver node related to the business information in the node of the business required for the business information to support the fast sharing of the business information confirmed according to the fast confirmation of the authority and support the business information during the confirmation to be easily confirmed when searching the shared ledger, thereby securing convenience and reliability for the searching of the business information.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, detailed embodiments of the present invention will be described with reference to the drawings.

Figure 1:
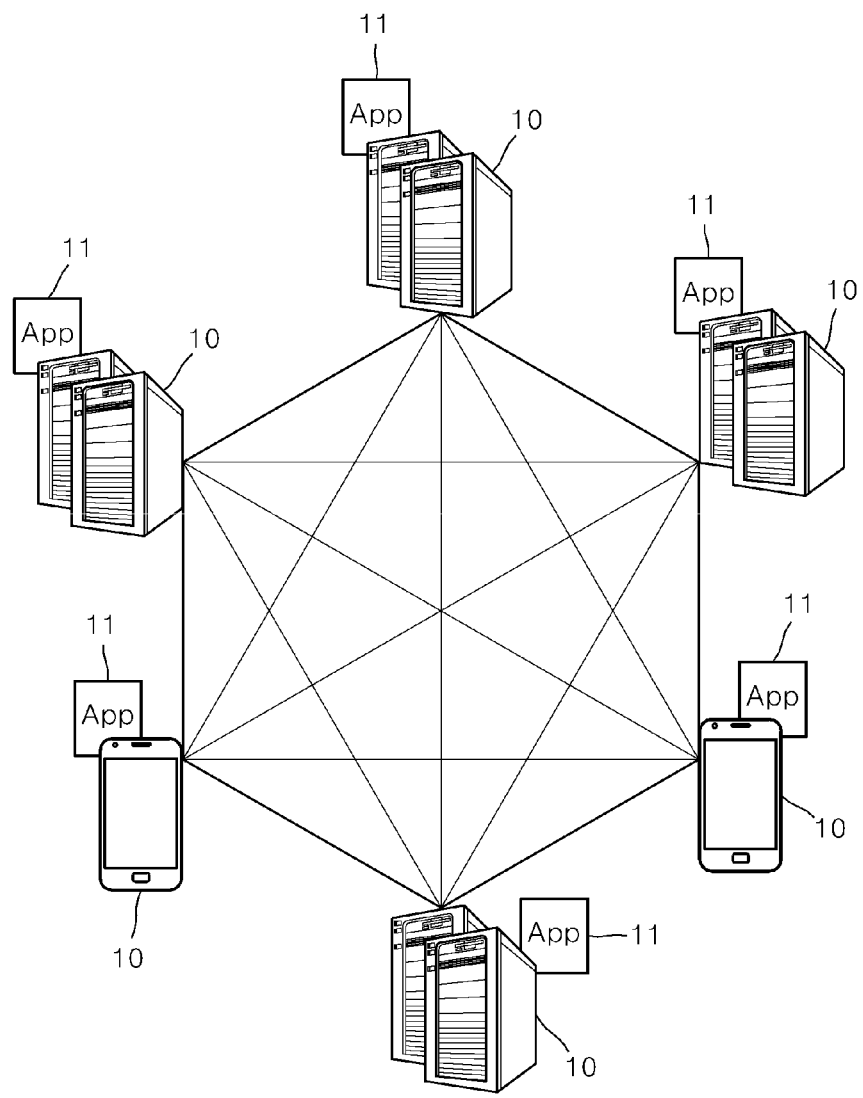
FIG. 1 is a configuration diagram of a system for sharing business information based on a blockchain according to an embodiment of the present invention.

FIG. 1 is a configuration diagram of a system for sharing business information based on a blockchain according to an embodiment of the present invention, and as illustrated in FIG. 1, a plurality of different terminals are mutually connected to each other through a network and the terminal may function as a node 10 of a blockchain.

At this time, the blockchain described in the present invention is an algorithm which commonly manages security information by constituting a plurality of pieces of transaction information into blocks and connecting many blocks to each other like a chain using a hash to distribute and store the information in digital equipment of nodes 10 which are participants (peers) other than a central management server in a P2P network distribution environment. Since the forgery and falsification of the data are impossible by using the blockchain, is possible to perform reliably safe transaction and data processing even without an authoritative authority.

In order to implement such a blockchain, an application unit 11 may be constituted in each of the plurality of different terminals, and the application unit 11 constituted in each of the plurality of different terminals may be constituted as a control unit which executes an application stored in the terminal and including algorithms required for operating as the nodes 10 of the blockchain.

At this time, the control unit executes the overall control function of the terminal using a program and data stored in a storage unit configured in the terminal. The control unit may include a RAM, a ROM, a CPU, a GPU, and a bus, and the RAM, the ROM, the CPU, and the GPU may be connected to each other via a bus. The CPU accesses the storage unit and may perform booting using an operating system (O/S) stored in the storage unit and perform various operations described in the present invention while operating the application unit 11 using various programs, contents, and data stored in the storage unit.

In addition, the terminal may also include various components such as a communication unit for communicating with other terminals, a display unit for displaying various kinds of information, a storage unit for storing various kinds of data including the application-related data, a user input unit for receiving user input in addition to the control unit, and the control unit may control the components that configures the terminal.

At this time, the storage unit may be configured by a database (hereinafter, referred to as DB), or various storage units such as a physical hard disk, a solid state drive (SSD), and a web hard.

The terminal constituting each of the plurality of nodes 10 may include all types of handheld-based wireless communication devices which may be connected with an external server through a wireless communication network, such as a smart phone, a mobile phone, a person digital assistant (PDA), a portal multimedia player (PMP), and a tablet PC. In addition, the terminal may include a communication device which may be connected with the external server through a network, such as a desktop PC, a tablet PC, a laptop PC, and a set-top box.

In addition, the terminal constituting each of the plurality of nodes 10 may be implemented as a server operated by a specific business.

The terminal constituting each of the plurality of nodes 10 may store information shared on the blockchain in a security area of a memory or in a security area of the DB.

That is, in the present invention, the plurality of nodes 10 may be configured based on various types of blockchains, such that participants participating as the nodes 10 in the blockchain are constituted by homogeneous devices or heterogeneous devices.

In the following description, the node 10 and the terminal may be described as being mutually identical while duplicatedly used in accordance with a description aspect.

Meanwhile, at least one of the plurality of different nodes 10 constituting the blockchain may be configured as a business node 10 related to a business registering the business information in the blockchain, and at least another one of the plurality of different nodes 10 may be configured as an approver (or certifier) node 10 related to an authority confirming the business information.

Based on the aforementioned configuration, in the present invention, when the business information registered by the business is registered in the blockchain, the business designates a certification subject of the business information to the business information and the certification and approval of the certification authority which is the certification subject of the business information are performed so that two-way confirmation between the authority designated by the business and the business designating the authority for the specific business information is performed on the blockchain and the business information in which the two-way confirmation is performed through the blockchain is included in the block as a storage unit of the blockchain to be stored and shared in each of the plurality of nodes 10. As a result, when the business information is changed without notice, the forgery and falsification of the business information is fundamentally prevented by supporting the forged and falsified business information to be confirmed in comparison with the business information stored in each of the plurality of nodes 10, thereby securing the security, integrity and reliability of the business information. Hereinafter, a detailed operational example of the present invention will be described with reference to the drawings.

Figure 2:
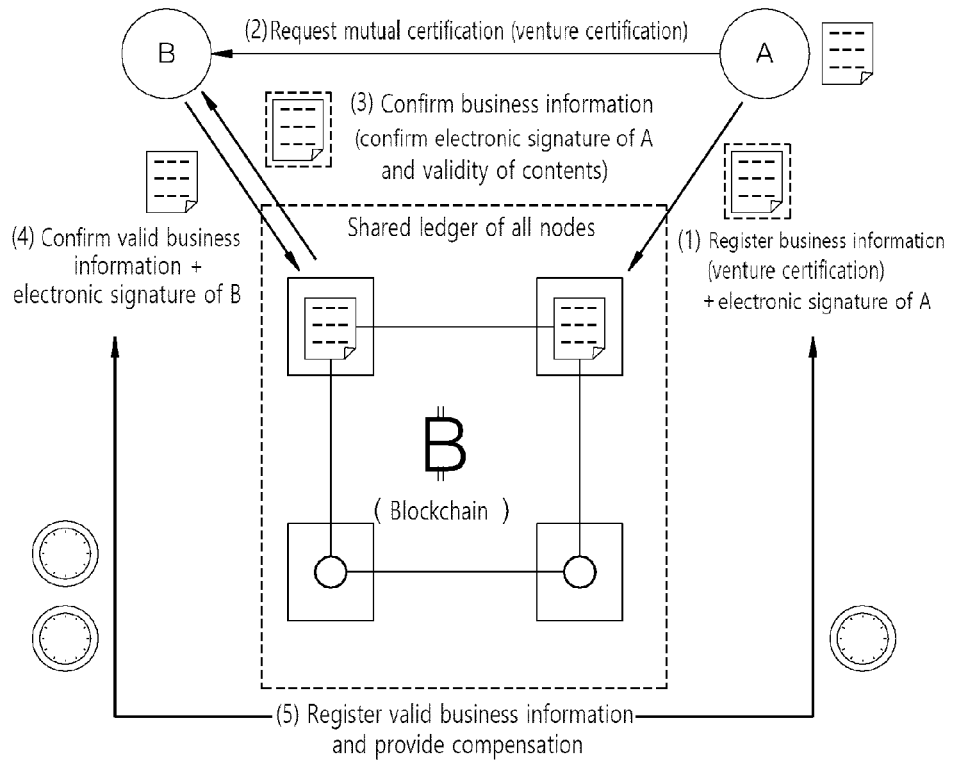
FIGS. 2 and 3 are exemplary diagrams of operations of the system for sharing the business information based on the blockchain for securing integrity and reliability of the business information according to the embodiment of the present invention.

First, FIG. 2 is an exemplary diagram of an operation of the system for sharing business information based on a blockchain for securing integrity and reliability of the business information according to the embodiment of the present invention.

As shown in FIG. 2, the application unit 11 of a specific node 10A may register business information which is a sharing target for sharing with the plurality of different nodes 10 constituting the blockchain in the blockchain.

In this case, the business information may various information such as basic information such as a business name, a business registration number, a representative, a registered officer, the location of the head store, financial information such as sales, business profits, and credit rating, and certification information certificated by the qualified office, such as venture business certification, innobiz certification, ISO-9001 certification, women's business certification, and disabled business certification.

In addition, the data included in the business information may include various types of data such as text-based documents, images, and moving images.

In addition, the application unit 11 of the specific node generates a first transaction for registering the business information, generates a hash value through a predetermined hash algorithm corresponding to the first transaction, and then transmits the hash value each of the plurality of nodes 10 constituting the blockchain to register the business information to the blockchain.

In this case, the application unit 11 of the specific node 10 may transmit the business information to all one or more nodes 10 except for the specific node 10 participating in the blockchain to which the specific node 10 belongs, according to the first transaction.

In addition, the transaction described in the present invention may mean transaction information, and the transaction information may include one or more operation functions and data required for performing a unit operation or a unit transaction.

In addition, the application unit 11 of the specific node 10 may include approver information on an approver that processes confirmation for the business information in the business information to register the approver information in the blockchain.

At this time, the approver (or the certifier) may be a certification authority that performs confirmation processing of the business information.

In addition, the application unit 11 of the specific node 10 may transmit request information for requesting confirmation of the business information to the approver node 10 B corresponding to the approver who is a certification subject of the business information based on the approver information included in the business information.

At this time, the application unit 11 of the specific node 10 may transmit the business information included in the request information.

In addition, the application unit 11 of the specific node 10 may perform a digital signature on the business information in order to maintain the security of the business information, and for example, may perform the digital signature by encrypting the business information by a predetermined personal key corresponding to the specific node 10.

Meanwhile, the application unit 11 configured in the approver node 10 may store the business information included in the request information in a storage unit included in the terminal constituting in the approver node 10. At this time, the storage unit may be a DB.

At this time, at least one of the plurality of different nodes 10 constituting the blockchain may be configured as a full node, and the application unit 11 configured in the full node 10 may store all information (e.g., business information, certification information to be described below, a hash value, etc.) generated in the blockchain in the storage unit.

Here, the full node 10 may be configured as the approver node 10 of a specific authority.

In addition, the application unit 11 of the node 10 set as a light node among the plurality of different nodes 10 constituting the blockchain may store only the hash value in the storage unit according to predetermined setting information related to the light node.

In addition, the application unit 11 of the approver node 10 may confirm and verify whether the digital signature is owned by the business corresponding to the specific node 10 when the business information is processed with the digital signature processed, and for example, may confirm and verify the business information by decoding the business information by a predetermined public key corresponding to the personal key of the specific node 10.

In addition, the application unit 11 of the approver node 10 may confirm the validity of the business information by checking the business information corresponding to the request information, and may generate a second transaction for registering the confirmation information including the business information in the blockchain when the validity confirmation is performed.

At this time, the application unit 11 of the approver node 10 may also generate a hash value through a predetermined hash algorithm corresponding to the second transaction, and then transmit the hash value to all of the nodes other than the approver node 10 constituting the blockchain to register the certification information on the blockchain.

The application unit 11 of the approver node 10 may transmit the certification information together with the hash value to all the nodes 10 other than the approver node 10 to register the certification information on the blockchain.

The application unit 11 of the approver node 10 may process the digital signature to verify that the certification information is generated by the approver node 10, and for example, may process the digital signature for the certification information by encrypting the certification information with a predetermined personal key corresponding to the approver node 10 like the specific node 10 described above.

In addition, the application unit 11 of each of the nodes 10 constituting the blockchain may confirm the validity of the certification information and register the validity of the certification information in a predetermined shared ledger when the confirmation is successful.

At this time, the application unit 11 of each of the entire nodes 10 constituting the blockchain may decrypt the certification information with a predetermined public key corresponding to the approver node 10 when receiving the certification information, and may confirm the validity of the certification information when the decryption of the certification information is successful.

In addition, the application unit 11 may selectively store the certification information according to the presence or absence of the setting information in the node 10 to which the application unit 11 belongs when the decryption is successful.

In addition, the application unit 11 of each of the specific node 10 and the approver node 10 may confirm the certification information registered in the blockchain through the shared ledger, and generate and store compensation information according to the registration of the certification information when the registration of the certification information is completed.

At this time, an electronic wallet for storing the compensation information may be set for each of all the nodes 10 belonging to the blockchain, and the application unit 11 of the node 10 which generates the compensation information, may cumulatively store the compensation information in the electronic wallet which is preset in the own node 10.

Herein, the compensation information may mean the amount of a settlement means commonly used in the blockchain, and for example, may mean a unique coin such as a bit coin or etherium.

In addition, when a browsing right of the business information included in the blockchain is set and the business information can be browsed only at the time of paying the settlement, the application unit 11 may browse the business information through the compensation information, that is, coin settlement unique to the present blockchain system.

Meanwhile, the system for sharing the business information based on the business information according to the embodiment of the present invention may secure the integrity by preventing the forgery and falsification of the business information and the certification information registered in the blockchain according to the above-described configuration, which will be described in detail with reference to FIG. 3.

Figure 3:
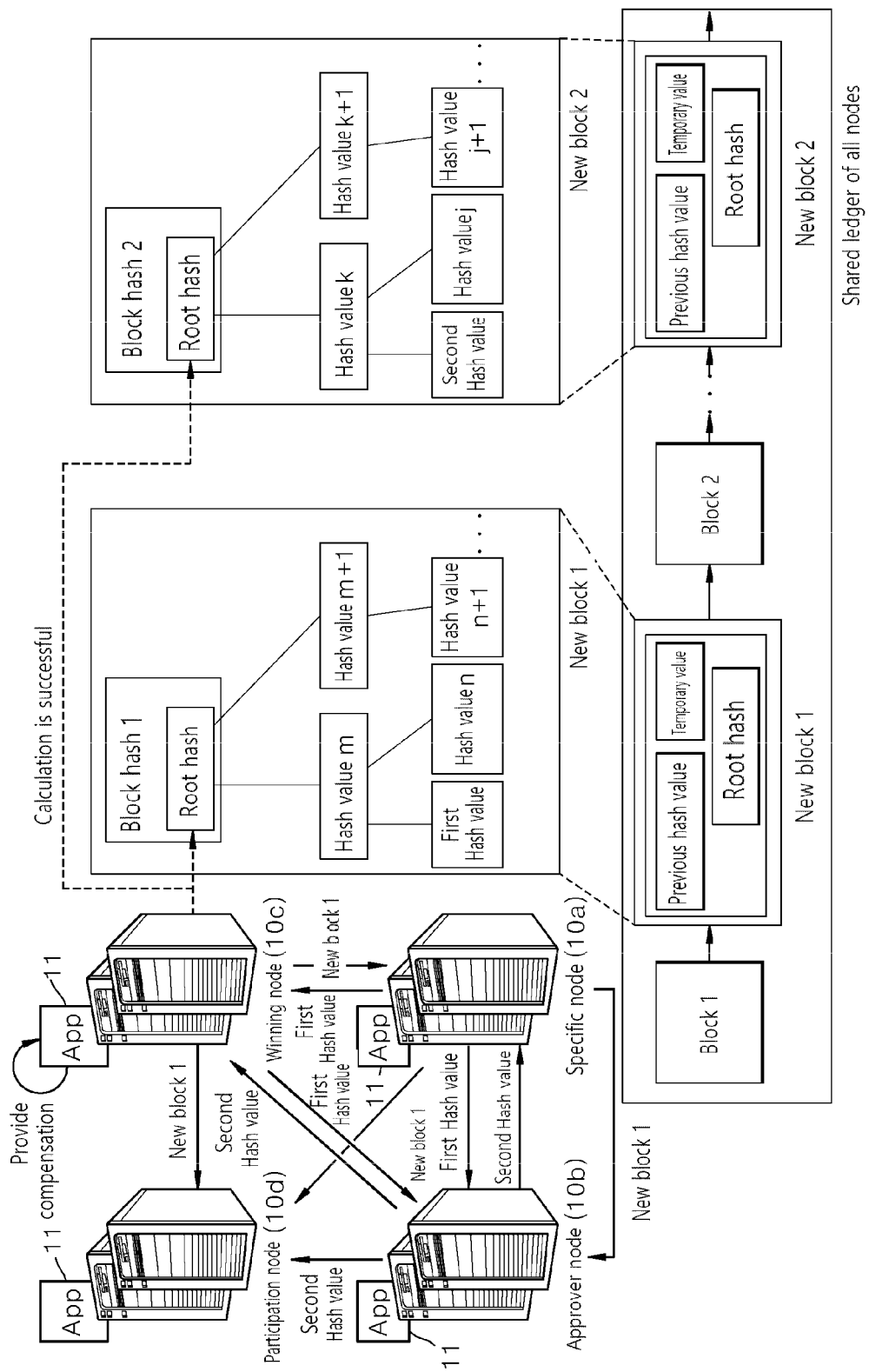

As shown in FIG. 3, the application unit 11 of each of the plurality of nodes 10 may generate a root hash value by applying a first hash value related to the first transaction received from the specific node 10a to a predetermined hash algorithm together with the hash value received from the different node 10 received for a generation period of the block corresponding to a time when the first hash value is received and generate a block including the root hash value and the first hash value.

In addition, the application unit 11 of each of the plurality of nodes 10 may generate a root hash value by applying a second hash value related to the second transaction received from the approver node 10b to a predetermined hash algorithm together with the hash value received from the different node 10 received for a generation period of the block corresponding to a time when the second hash value is received and generate a block including the root hash value and the second hash value.

In this case, the application unit 11 may generate a block including the first and second hash values when the first and second hash values are received or generated during one block generation period.

As a result, when one root hash necessarily exists in one block and any of the business information or the certification information is forged or falsified, the corresponding hash value and all hash values above the hash value are changed, and as a result, the root hash is varied, and thus when comparing only the root hash of the block, even if hashes below the hash value are not compared and checked one by one, it may be immediately confirmed whether the data is forged and falsified.

The application unit 11 of each of the plurality of nodes 10 may perform competition with the other node 10 to obtain a generation right of a new block connected to the blockchain when a block including at least one of the first hash value corresponding to the first transaction related to the business information and the second hash vale corresponding to the second transaction related to the certification information is generated according to a predetermined blockchain-related algorithm.

For example, when the application unit 11 of the node 10 having the proof of work for the block corresponding to the business information or the certification information among the mode nodes 10 constituting the blockchain corresponds to the certification information may occupy the generation right of the new block corresponding to the certification information and generate the new block corresponding to the business information or the certification information and then transmit the new block to one or more other nodes 10 participating in the blockchain.

At this time, the proof of work (PoW) is an algorithm of verifying that the node has participate in the corresponding work by infinitively repeating a process of fining a block hash having a predetermined value or less and may be predetermined in the application unit 11.

The application unit 11 combines a generation date, a version, bits, a root hash, a hash of the previous block, a temporary value called nonce, and the like of the new block and then converts the combined value into a hash to generate a block hash value of the new block.

Accordingly, the application unit 11 of each of the nodes 10 constituting the blockchain may configure a new block by grouping all the transactions made during the generation period of the block corresponding to the new block into one and compete the plurality of different nodes 10 with each other in order to find a hash value of a target value of less so as to occupy the generation right of the new block for the connection to the previous block of the new block in the blockchain when the configuration of the block is completed.

In addition, among a lot of nodes 10 participating in the network, the node 10 that first finds the block hash value lower of a target value or less wins the competition, and the application unit 11 of a winning node 10c which is the node 10 first finding the block hash informs to a mode node 10 that the node wins in the competition and the application unit 11 of the winning node 10c may transmit the generated new block to one or more other nodes 10 except for the winning node 10c.

In addition, the application unit 11 of other node(s) 10 participating in the blockchain-related network other than the winning node 10c may check the validity of the new block received from the winning node 10c and transmit approval information for approving the generation of the new block to other node(s) 10 constituting the blockchain other than the winning node if there is no abnormality.

The application unit 11 of each of the plurality of nodes participating in the network collects the approval information received from other node (s) 10 other than its own node 10 and selects the corresponding new block as a normal block when a majority of the nodes 10 participating in the entire network approves the newly generated block to add the selected new block to the predetermined shared ledger.

At this time, the application unit 11 may connect and store the new block to a previous block generated just before the generation of the new block among one or more blocks included in the shared ledger like a chain.

In addition, the application unit 11 of the winning node 10c may generate compensation information corresponding to a predetermined amount when acquiring the generation right of the new block and store the compensation information in an electronic wallet predetermined (stored) in the winning node 10c.

In addition to the above-mentioned configuration, the application unit 11 of each of all the nodes 10 constituting the blockchain calculates a sharing ratio of the nodes having a predetermined share or more based on the compensation information generated and cumulatively stored through the blockchain and then set a node randomly selected according to a type (called 'share verification') in which the probability to be selected as a block generator is determined in proportion to the sharing ratio held for each node as the winding node 10c.

In addition, the application unit 11 of the winning node 10c may generate the new block corresponding to the business information or the certification information, and transmit the new block to other nodes 10.

According to the above configuration, the application unit of each of the plurality of different nodes may store the new block which is connected to the previous block in the predetermined shared ledger, and even if the business information or the certification information is forged and falsified by infringement to the specific node, when the hash value of the block stored in the specific node connected like the chain using the hash in the shared ledger is changed according to the forgery and falsification based on the blockchain, the block of which the hash value is changed is easily found in comparison with the shared ledger of the other node to detect the forgery and falsification of the business information or the certification information, thereby securing the integrity and stability of the data related to the business information and the certification information.

As described above, in the present invention, the node corresponding to the business among the plurality of nodes constituting the blockchain confirms that a registration subject of the business information is the business associated with the business information through the electronic signature with respect to the business information required for the authority certification, and the authority-related node processing the confirmation on the business information among the plurality of nodes performs the confirmation on the business information to share confirmation result in the blockchain constituted by the plurality of nodes during confirmation. As a result, reliable business information which has been mutually confirmed between the business and the certification authority may be shared so as to be easily confirmed on the blockchain and the confirmed business information may be managed by the blockchain-based block in the plurality of nodes so as not to be forged and falsified, thereby securing the reliability and integrity of the business information.

Meanwhile, in the system for sharing the business information based on the blockchain according to the embodiment of the present invention, when a contract condition is set in the business information and a transaction satisfying the contract condition occurs, a node corresponding to a party of the contract condition automatically executes the transaction according to the contract condition to support a smart contract based on the blockchain so that a subsequent process is performed. As a result, it is possible to prevent update information from being missed in accordance with the contract condition in the case where the validity of the business information is confirmed, but the validity period is present or the validity of the certification is lost in the occurrence of a specific situation, which will be described in detail with reference to FIG. 4.

Figure 4:
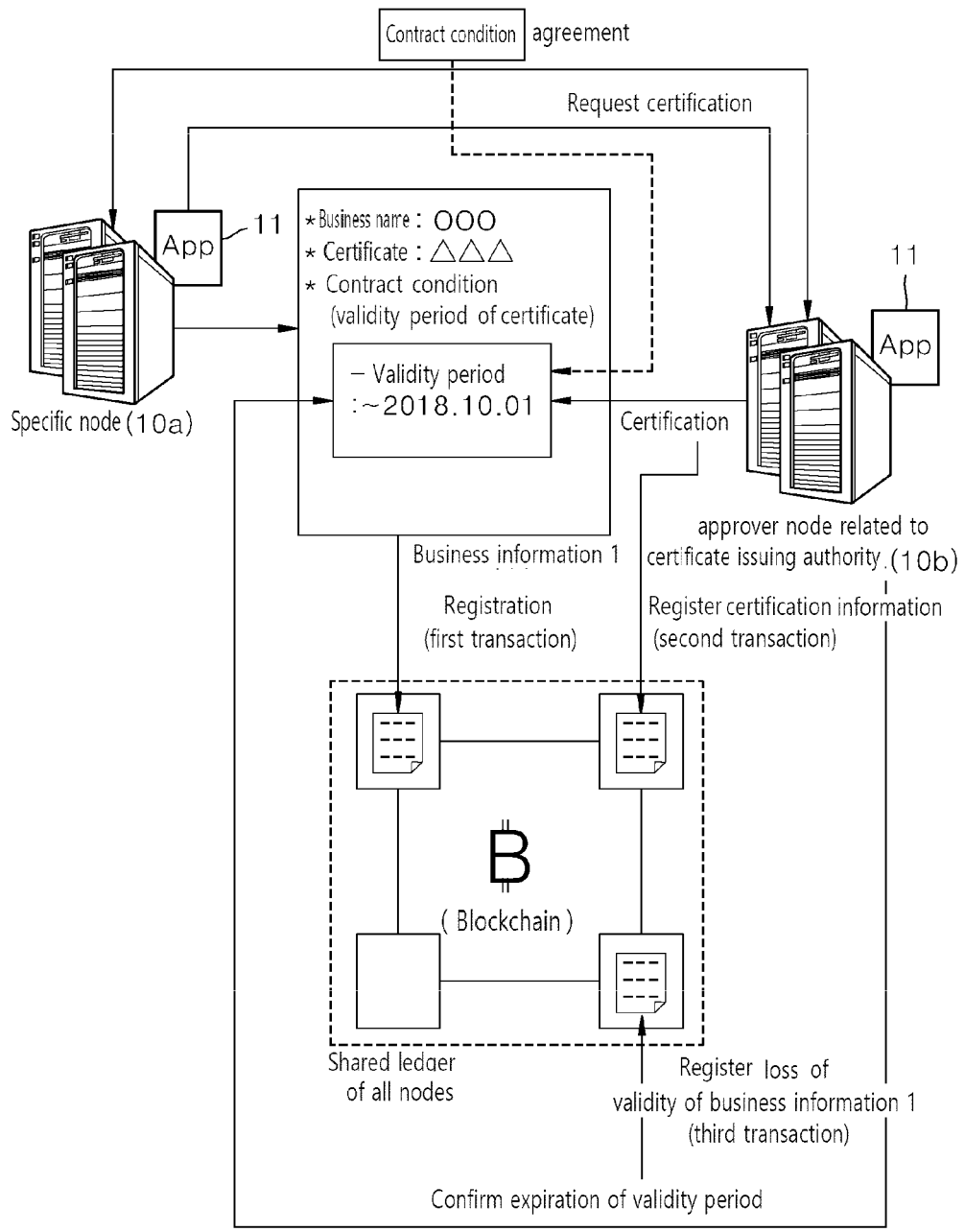
FIG. 4 is an exemplary diagram of an operation related to a smart contract of the system for sharing the business information based on the blockchain according to an embodiment of the present invention.

As shown in FIG. 4, the application unit 11 of the specific node 10a may register the business information in which the contract condition exists in the blockchain and transmit and share first transaction information including a hash value corresponding to the first transaction related to registration of the business information and the first transaction-related data to the plurality of different nodes 10 except for the specific node 10a constituting the blockchain to register the first transaction information on the blockchain.

In this case, the smart contract-based contract condition may include at least one function for allowing contract contents agreed between the contracting parties to be executed automatically when the specific conditions are satisfied later between the contracting parties.

Further, the approver node 10b may confirm the validity of the business information as described above, and then generate and register the second transaction related to the registration of the certification information according to the validity confirmation of the business information on the blockchain, and transmit and share the second transaction related to the registration of the certification information to the plurality of different nodes 10.

At this time, the approver node 10b transmits second transaction information including a hash value corresponding to the second transaction and the second transaction-related data to the plurality of different nodes 10 except for the approver node 10b constituting the blockchain to register the second transaction information on the blockchain.

When a third transaction satisfying the contract condition of the business information whose validity is confirmed by the approver node 10b is generated, the application unit 11 of the node 10 corresponding to a condition execution subject of the contract condition generates the third transaction according the execution of the contract condition to register the third transaction in the blockchain.

At this time, the third transaction may also be registered in the same manner as the method of registering the blockchain of the first and second transactions.

For example, when the contract condition that sets the validity period of a certificate is included in the business information including the certificate issued to the business by a specific authority, the application unit 11 of the approver node 10b related to the specific authority may receive and store the business information and then automatically generate the third transaction related to the registration of the update information for losing the validity of the certificate at the expiration of the validity period of the certificate according to the contract condition included in the business information.

In addition, the application unit 11 of the approver node 10b may register the update information in the blockchain through the electronic signature and transmit third transaction information including a hash value related with the third transaction and data including the update information processed with the electronic signature to the plurality of different nodes 10 except for the approver node 10b participating in the blockchain.

Also, the application unit 11 of each of all the nodes 10 constituting the blockchain confirms the validity of the third transaction, includes the third transaction-related information in the block corresponding to the reception time of the third transaction as described above at the time of successful confirmation, and register a new block received from the node 10 having the generation right of the new block corresponding to the third transaction in a predetermined shared ledger.

As another example, when the confirmation of the business information of the authority is delayed or the generation of the new block corresponding to the business information is delayed in a situation where fast sharing of the business information is required, it is possible to set a contract condition in which a penalty is received when a specific business corresponding to the business information fails the certification of the authority, in the business information.

Accordingly, when the application unit 11 of the specific node 10a corresponding to the specific business receives the transaction related to the confirmation failure for the certification information from the approver node 10b, which is the certification subject of the business information, the application unit 11 may automatically apply a penalty such as subtracting a part of a holding value (holding amount) according to the compensation information cumulatively stored in the electronic wallet predetermined according to the contract condition or lowering a grade of the specific business.

In addition, the application unit 11 of the specific node 10a generates fourth transaction-related information for registering the update information according to the penalty application on the blockchain and transmits the fourth transaction-related information to the plurality of different nodes 10, and register a block related to the fourth transaction in the shared ledger of each node 10 during the validity confirmation of the fourth transaction of the plurality of different nodes 10.

On the other hand, in the above-described configuration, in the case where a plurality of contract conditions set in the business information are satisfied, whenever any one of the plurality of contract conditions is satisfied, the application unit 11 of the node 10 corresponding to the condition execution subject of the satisfied condition may generate a transaction according to the execution of the contract condition to register the generated transaction in the blockchain.

As described above, according to the present invention, in accordance with the smart contract based on the blockchain, the contract information is set in the business information so that the contract contents according to the agreement between the contract parties are automatically executed when the specific condition is satisfied to support the validity of the business information to be automatically lost at the expiration of the validity period set by the authority according to the contract condition or the authority to secure the reliability of the business information whose confirmation is delayed, thereby enhancing the reliability of the sharing of the business information.

The application unit 11 of each of the plurality of different nodes 10 accesses the full node 10 storing the business information and searches a shared ledger stored in the storage unit of the full node 10 or searches the shared ledger stored in its own storage unit (or DB) to confirm the business information, thereby sharing the business information among the plurality of different nodes 10.

In addition, a search node 10 which receives a search request related query when requesting the search of the business information from an external terminal 100 not belonging to the blockchain may search the its own storage unit (or DB) or transmit the search request related search request information to the node 10 corresponding to the full node 10 of the blockchain and transmit the received business-related business information corresponding to the search request information.

At this time, the search node 10 may transmit both the business information corresponding to the search request and the validity confirmation related confirmation information of the business information by the approver node 10*b* related to the certification authority of the business information, or extract the business information from the certification information including the business information satisfying the query to transmit the extracted business information to the external terminal 100 or transmit only the certification information to the external terminal 100.

Accordingly, the present invention may support the external terminal to confirm that the business information registered in the blockchain is reliable information based on the certification information received together with the business information received in response to the search request, thereby securing the reliability of the business information and simultaneously securing the integrity of the business information shared based on the blockchain to secure data accuracy and stability of the data.

However, in the above-described configuration, in the state where the validity confirmation of the business information registered on the blockchain is not yet completed but delayed by the approver node 10*b* related to the certification authority, the business may not confirm the certification related certification information on the blockchain to fail the confirmation of the business information when the fast confirmation of the business information is required and generate the damage to the business.

For example, like a state in which the bidding for the specific business is in progress, the specific business has submitted the business information to participate in a specific support project, or the specific business has submitted business information for judgment of loan, in a situation where certification information related to validity confirmation through the certification authority of the business information according to the registration state of the business information is required and confirmation of the certification information is required by the blockchain, a deadline for the situation is set and when the confirmation of the certification authority is not processed until the deadline, the damage to the business such as the failure of the bidding process, the failure to participate in the supporting project, and the failure of the judgment of the loan may occur.

In addition, since a block generation period needs to be considered in a period in which a new block corresponding to the certification information is registered in the blockchain, several tens of minutes to several hours may be required until certification information corresponding to the business information is registered after registering the business information in the blockchain.

Figure 5:
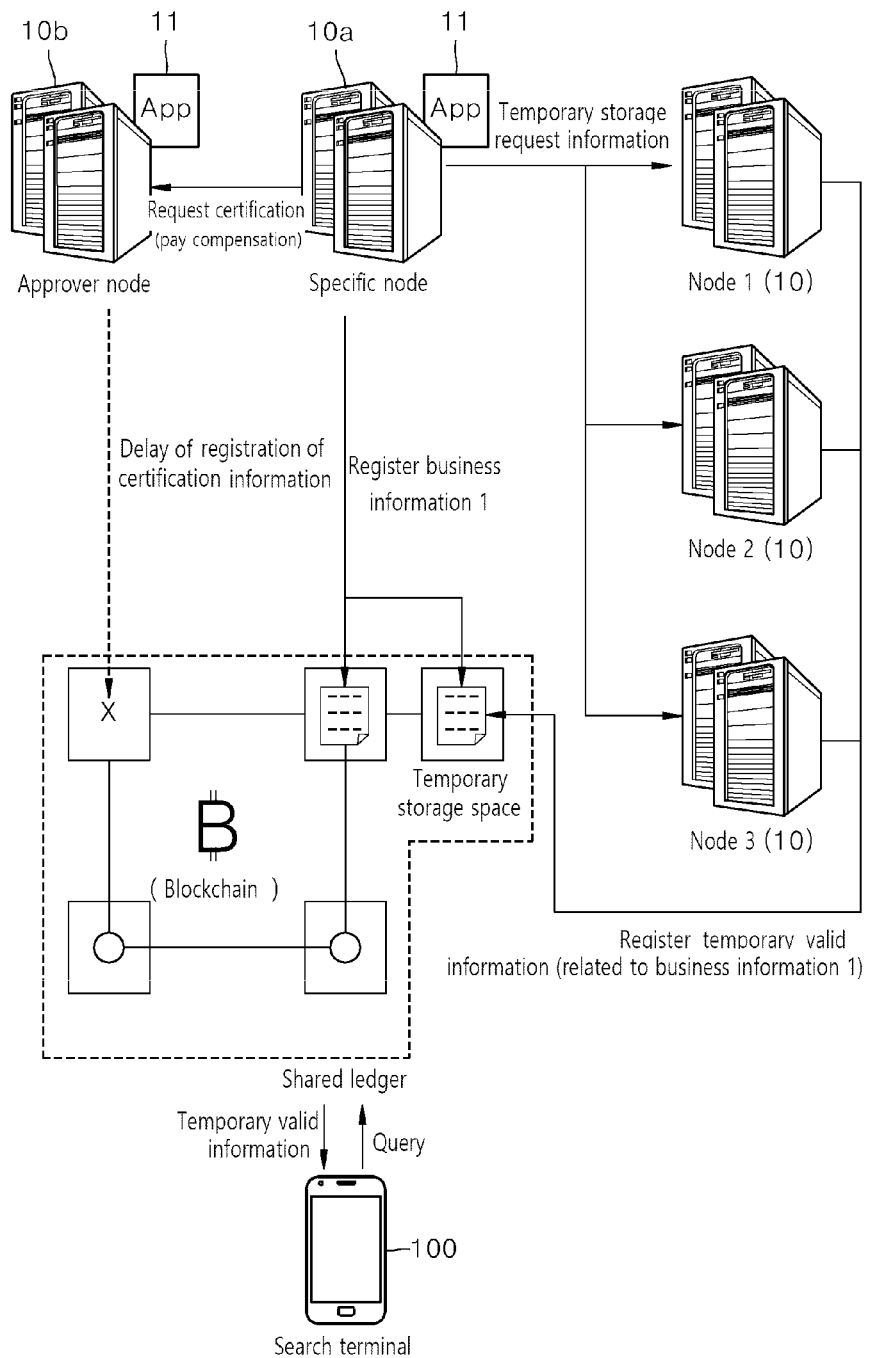
FIG. 5 is an exemplary diagram of an operation related to a fast confirmation process of business information in the system for sharing the business information based on the blockchain according to the embodiment of the present invention.

The system for sharing the business information based on the blockchain according to the present invention may operate as shown in FIG. 5 in order to secure the flexibility of the blockchain for solving the problem caused by the registration delay of the certification information.

First, the application unit 11 of the specific node 10*a* generates a hash value related to business information 1 and then transmits the generated hash value to all the nodes 10 participating in the blockchain to register the business information 1 in the blockchain.

At this time, the confirmation completion time may be set in the business information 1 when fast confirmation is required.

The application unit 11 of the specific node 10*a* may transmit confirmation request information related to the confirmation request of the business information 1 to the approver node 10*b* corresponding to the approver based on approver information related to an approver preset in the business information 1.

At this time, the application unit 11 of the specific node 10*a* may cumulatively store a required time from the registration time of all the business information until the business information is registered in the blockchain to be confirmed in the shared ledger prestored in the specific node 10*a* and then calculate a statistical time by averaging the cumulatively stored required time.

Accordingly, the application unit 11 of the specific node 10*a* compares the confirmation completion time with the statistical time when the confirmation completion time exists in the business information 1 and may confirm the business information 1 in which the statistical time is larger as a target requiring fast processing.

The application unit 11 of the specific node 10*a* subtracts a predetermined setting amount of a holding amount cumulatively stored according to the compensation information in the electronic wallet of the specific node 10*a* by the approver node 10*b* corresponding to the approver information included in the business information 1 requiring the fast processing and generates request information including paid information that promises to pay the setting amount to the approver of the approver node 10*b* upon fast processing of the business information to transmit the generated request information to the approver node 10*b*.

That is, the application unit 11 of the specific node 10*a* may transmit the request information for requesting the fast processing of the business information while informing that the compensation thereof during the fast processing of the business information is paid to the approver node 10*b* with respect to the business information required for the fast processing.

Accordingly, the present invention may support the compensation corresponding to the fast processing of the approver node 10*b* with respect to the business information of the specific node 10*a* to induce the fast confirmation of the business information in the approver node 10*b*.

When the application unit 11 of the specific node 10*a* has not yet completed the confirmation and the block for the registration-related transaction of the business information requiring the fast processing is not completed and can not be confirmed at the shared ledger, the registration-related transaction of the business information requiring the fast processing is stored in a predetermined temporary storage space as temporary valid information by interlocking with the shared ledger preset in the specific node 10*a* and the registration-related transaction of the business information requiring the fast processing may be searched when the shared ledger is searched.

The application unit 11 of the specific node 10*a* may transmit temporary storage request information for requesting the registration-related transaction of the business information 1 to be stored in the temporary storage space of each of all the nodes 10 in all the nodes 10 belonging to the blockchain.

At this time, the temporary storage request information may include registration-related transaction information of the business information 1.

Accordingly, the application unit 11 of each of all the nodes 10 belonging to the blockchain may store the registration-related transaction information of the business information 1 included in the temporary storage request information in the temporary storage space of the predetermined node 10 as the temporary valid information.

Accordingly, all the nodes 10 including the specific node 10*a* belonging to the blockchain may confirm the transaction according to the temporary valid information when searching the its own shared ledger and transmit the transaction according to the temporary valid information when receiving the query related with the business information 1 from the external terminal 100 to provide the business information 1 and inform that the confirmation of the business information 1 is performed.

Through the aforementioned configuration, the present invention may support the compensation according to the fast confirmation to be paid to the approver node related to the business information in the node of the business required for the business information to support the fast sharing of the business information confirmed according to the fast confirmation of the authority and support the business information during the confirmation to be easily confirmed when searching the shared ledger, thereby securing convenience and reliability for the searching of the business information.

On the other hand, in the above-described configuration, the application unit 11 of the specific node 10*a* may include a browsing right of the business information when registering the business information in the business information and register the browsing right in the blockchain.

Accordingly, the application unit 11 of each node 10 belonging to the blockchain determines whether there is the browsing right of the business information based on the browsing right set in the business information and may display the business information through the display unit of the terminal corresponding to the its own node 10 only when there is the browsing right.

In addition, when the browsing right is limited to the time of paid settlement of a fixed amount, the application unit 11 confirms the holding amount prestored in the electronic wallet of the node 10 according to the compensation information when receiving a selection input of the user for the browsing the business information in which the paid settlement is set as the browsing right, subtracts a part of the amount required for acquiring the browsing right of the holding amount and then browses the business information to display the browsed business information on the display unit of the its own terminal, and generates compensation information corresponding to the paid settlement according to the browsing of the business information to transmit the compensation information to the node 10 which is a registration subject of the business information.

Accordingly, the application unit 11 of the registration node 10 which registers the business information receives the compensation information from the browsing node 10 browsing the business information to cumulatively store the compensation information in the electronic wallet predetermined in the registration node 10 corresponding to the business information.

Figure 6:
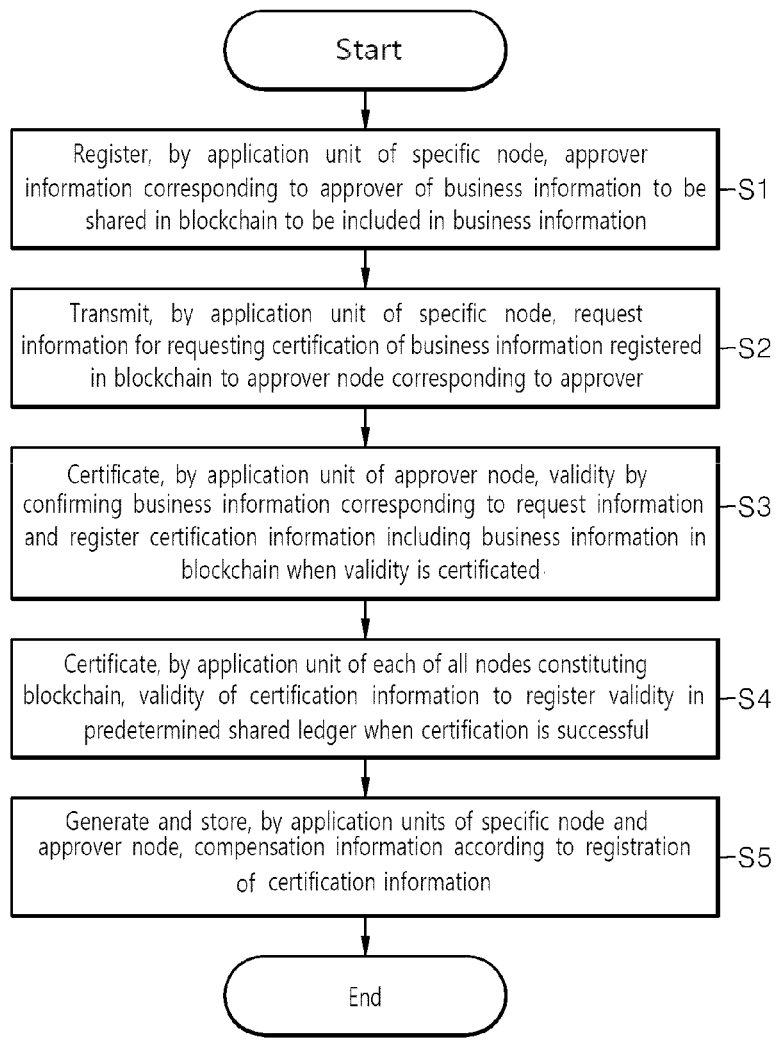
FIG. 6 is a flowchart of a method for sharing business information based on a blockchain according to an embodiment of the present invention.

FIG. 6 is a flowchart of a method for sharing business information based on a blockchain in which a plurality of different terminals are connected to each other through a network, an application unit for operating the terminal as a node of the blockchain is configured in each of the plurality of different terminal, and business information registered in the blockchain is shared with each other.

First, the application unit 11 of the specific node 10*a* may include approver information corresponding to the approver of the business information to be shared in the business information to register the approver information in the blockchain (S1).

In addition, the application unit 11 of the specific node 10*a* may transmit request information for requesting confirmation of the business information registered in the blockchain to the approver node 10*b* corresponding to the approver (S2).

In addition, the application unit 11 of the approver node 10 may confirm the validity of the business information corresponding to the request information and register the certification information including the business information in the blockchain when the validity is confirmed (S3).

In addition, the application unit 11 of each of the nodes 10 constituting the blockchain may confirm the validity of the certification information and register the validity of the certification information in a predetermined shared ledger when the confirmation is successful (S4).

The application units 11 of the specific node 10*a* and the approver node 10*b* may generate and store compensation information according to the registration of the certification information (S5).

The present invention differs from conventional blockchain systems such as Bitcoin, Etherium, and EOS, and includes important technological innovations for managing business information in a blockchain.

First, in an existing blockchain system, each node is characterized by anonymity, but in the present system, identity certification of each node is required.

Second, in the existing blockchain system, one node records a one-sided transaction transmitting information or a value to another node, but in the present system, mutual confirmation between the node registering the business information and the node confirming the business information is required. Accordingly, in this system, information on a node having a right to confirm the corresponding information is included in the information recorded in the blockchain. As a result, the present system requires additional concepts such as a first transaction (information registration) and a second transaction (information confirmation) that did not exist in the existing system.

Third, in the existing blockchain system, if one node transmits information or value to another node, it can not be canceled, but in the present system, the information that requires mutual approval can be intermediately canceled before the final confirmation.

Fourth, unlike the existing blockchain system, in the present system, when the emergent processing is required, the corresponding transaction is first processed, and if the problem occurs, there is a function of imparting a penalty later.

Fifth, in the existing blockchain system, all participants may browse the information recorded in the blockchain, but in the present system, a browsable range of the information is registered to be included in the blockchain information to allow only a node having a legal right to browse the related information.

Sixth, by expanding the browsing right function of the information described above, only when a certain browsing fee is paid to a user who wants to browse specific information, the information is allowed to be browsed, so that the compensation information acquired by the block generation may be used in the system.

Various apparatuses and components described in the present specification may be embodied by a hardware circuit (for example, a CMOS based logic circuit), firmware, software, or combinations thereof. For example, the apparatuses and components may be embodied by using a transistor, a logic gate, and an electronic circuit in the forms of various electric structures.

The aforementioned contents can be corrected and modified by those skilled in the art without departing from the essential characteristics of the present invention. Accordingly, the various embodiments disclosed herein are not intended to limit the technical spirit but describe with the true scope and spirit being indicated by the following claims. The protection scope of the present invention should be construed based on the following appended claims and it should be appreciated that the technical spirit included within the scope equivalent to the claims belongs to the present invention.

What is claimed is:

1. A method for sharing business information based on a mutual confirmation blockchain in which a plurality of certified terminals are connected to each other through a network, wherein each of the plurality of the certified terminal includes an application unit for operating thereof as a node of a blockchain, and wherein business information registered in the blockchain is shared among the plurality of the certified terminals, the method comprising steps of:

registering, by an application unit of a specific node, approver information, wherein the approver information corresponds to an approver of the business information to be shared;

transmitting, by the application unit of the specific node, request information for requesting confirmation of the business information registered in the blockchain to the approver node corresponding to the approver;

confirming, by an application unit of the approver node, validity of the request information, and registering certification information and the business information in the blockchain when the validity is confirmed;

confirming, by the application unit of each of the nodes of the blockchain, validity of the certification information such that a validity in a preset shared ledger is registered when the confirmation is successful;

generating and storing, by the application units of the specific node and the approver node, compensation information according to the registration of the certification information of the approver; and storing, by the application unit of the specific node and when the business information requires fast processing, a registration-related transaction of the business information in a predetermined temporary storage space as temporary valid information, and requesting each of the nodes belonging to the blockchain to store the temporary valid information in the predetermined temporary storage space such that the registration-related transaction of the business information corresponding to the temporary valid information stored in the temporary storage space is searched when searching the shared ledger, subtracting, by the application unit of the specific node, a predetermined setting amount of a holding amount cumulatively stored according to the compensation information in the electronic wallet of the specific node corresponding to the business information requiring the fast processing and generating the request information including paid information that promises to pay the setting amount to the approver of the approver node upon fast processing of the business information to transmit the generated request information to the approver node, wherein the generating and storing the compensation information step further provides the business information of the specific node and registers the valid business information in the blockchain through mutual confirmation, wherein the business information further includes the approver information, and wherein a contract condition that a penalty is received when the confirmation of the approver is failed in the business information corresponding to the temporary valid information.

2. The method of claim 1, further comprising:

registering, by the application unit of the specific node, a browsing right of the business information to be included in the business information when registering the business information.

3. The method of claim 1, further comprising:

generating a block corresponding to the certification information and then transmitting the generated block to one or more other nodes participating in the blockchain, by the application unit of the node having a generation right of the block corresponding to the business information or the certification information among mode nodes constituting the blockchain; and registering, by the application unit of each of one or more other nodes, the block in the shared ledger by connecting the block to a previous block of the shared ledger.

4. The method of claim 3, further comprising:

calculating, by the application unit of each of all the nodes constituting the blockchain, a sharing ratio of the nodes having a predetermined share or more based on the compensation information generated and cumulatively stored through the blockchain and then generating a block corresponding to the business information or certification information, by an application unit of a node randomly selected according to a method of determining a probability to be selected as a block generator in proportional to the sharing ratio held for each node to transmit the generated block to other nodes.

5. The method of claim 3, further comprising:
generating a block corresponding to the business information or certification information and then transmitting the generated block to one or more other nodes participating in the blockchain, by an application unit of a node having proof of work for the block corresponding to the business information or the certification information among the mode nodes constituting the blockchain.

6. The method of claim 5, further comprising:
generating and storing the compensation information by an application unit of a node having the proof of work.

7. The method of claim 1, further comprising:
registering, by the application unit of the specific node, business information in which a contract condition exists;

generating a transaction according to the execution of the contract condition to register the generated transaction in the blockchain, by an application unit of a node corresponding to a condition execution subject of the contract condition when generating a transaction satisfying the contract condition of the business information in which the validity is confirmed by the approver node; and confirming, by the application unit of each of all nodes constituting the blockchain, the validity of the transaction to register the validity in the predetermined shared ledger when the confirmation is successful.

8. The method of claim 7, further comprising:
generating a transaction according to the execution of the contract condition to register the generated transaction in the blockchain, by an application unit of a node corresponding to a condition execution subject of a satisfying condition whenever any one of a plurality of contract conditions is satisfied when the business information has a plurality of contract conditions.

* * * * *